United States Patent
Kogel-Hollacher et al.

(10) Patent No.: US 11,090,760 B2
(45) Date of Patent: Aug. 17, 2021

(54) METHOD AND DEVICE FOR MEASURING AND CONTROLLING A DISTANCE BETWEEN A MACHINING HEAD AND A WORKPIECE

(71) Applicant: Precitec GmbH & Co. KG, Gaggenau (DE)

(72) Inventors: Markus Kogel-Hollacher, Haibach (DE); Matthias Strebel, Gaggenau (DE); Axel Hatwig, Gernsbach (DE); Andreas Rudolf, Kuppenheim (DE)

(73) Assignee: Precitec GmbH & Co. KG, Gaggenau (DE)

( * ) Notice: Subject to any disclaimer, the term of this patent is extended or adjusted under 35 U.S.C. 154(b) by 327 days.

(21) Appl. No.: 16/034,155

(22) Filed: Jul. 12, 2018

(65) Prior Publication Data
US 2019/0015931 A1     Jan. 17, 2019

(30) Foreign Application Priority Data
Jul. 14, 2017 (DE) .................. 10 2017 115 922

(51) Int. Cl.
*B23K 26/04* (2014.01)
*G01B 11/14* (2006.01)
(Continued)

(52) U.S. Cl.
CPC .......... *B23K 26/048* (2013.01); *B23K 26/032* (2013.01); *B23K 26/0869* (2013.01);
(Continued)

(58) Field of Classification Search
CPC .... G01B 9/0209; G01B 11/026; G01B 11/14; B23K 26/34; B23K 26/0869; B23K 26/048; B23K 26/21; B23K 26/36; B23K 26/032
(Continued)

(56) References Cited

U.S. PATENT DOCUMENTS

| 3,970,911 A | * | 7/1976 | Schmall | ................. | B23K 7/102 |
| | | | | | 318/607 |
| 5,202,745 A | * | 4/1993 | Sorin | ................. | G01M 11/3172 |
| | | | | | 356/479 |

(Continued)

FOREIGN PATENT DOCUMENTS

| DE | 38 26 634 A1 | 2/1989 |
| DE | 100 56 329 B4 | 10/2006 |

(Continued)

OTHER PUBLICATIONS

DE 102014011569 A1 Translation (Year: 2016).*
(Continued)

*Primary Examiner* — Eric S Stapleton
(74) *Attorney, Agent, or Firm* — Fenwick & West LLP

(57) ABSTRACT

The invention pertains to measuring, adjusting and/or controlling a distance between a machining head, particularly a laser machining head, and a workpiece, comprising a measurement light source, a beam splitter that splits the light of the measurement light source into a measurement light beam and a reference light beam, a reference arm, through which the reference light beam is guided, an optical system for coupling the measurement light beam into a processing beam path featuring a focusing lens, an optical device for superimposing the measurement light beam, and a measurement and evaluation unit.

4 Claims, 2 Drawing Sheets

(51) Int. Cl.
*B23K 26/03* (2006.01)
*B23K 26/21* (2014.01)
*B23K 26/36* (2014.01)
*B23K 26/34* (2014.01)
*B23K 26/08* (2014.01)
*G01B 9/02* (2006.01)
*G01B 11/02* (2006.01)

(52) U.S. Cl.
CPC .............. *B23K 26/21* (2015.10); *B23K 26/34* (2013.01); *B23K 26/36* (2013.01); *G01B 9/0209* (2013.01); *G01B 11/026* (2013.01); *G01B 11/14* (2013.01)

(58) Field of Classification Search
USPC ................................. 318/400.06; 219/121.75
See application file for complete search history.

(56) References Cited

U.S. PATENT DOCUMENTS

| | | | | |
|---|---|---|---|---|
| 5,268,741 A * | 12/1993 | Chou | ................ | G01M 11/3172 356/479 |
| 5,615,011 A * | 3/1997 | Boisrobert | ......... | G01M 11/3172 356/479 |
| 5,712,705 A * | 1/1998 | Fattinger | .............. | G01N 21/552 356/521 |
| 6,134,003 A * | 10/2000 | Tearney | ............. | A61B 1/00096 356/479 |
| 6,473,165 B1 * | 10/2002 | Coombs | ................. | G07D 7/121 356/71 |
| 6,501,551 B1 * | 12/2002 | Tearney | ............. | A61B 1/00096 356/477 |
| 6,903,820 B2 * | 6/2005 | Wang | ................... | A61B 5/0059 356/369 |
| 7,242,833 B2 * | 7/2007 | Yang | .................. | A61B 1/00096 385/115 |
| 7,366,376 B2 * | 4/2008 | Shishkov | ............. | A61B 5/0066 385/100 |
| 7,382,949 B2 * | 6/2008 | Bouma | ............. | A61B 1/00183 385/25 |
| 7,428,057 B2 * | 9/2008 | De Lega | ............ | G01B 9/023 356/497 |
| 7,466,429 B2 * | 12/2008 | de Groot | ............ | G01B 11/0675 356/497 |
| 7,551,293 B2 * | 6/2009 | Yelin | .................. | G01B 11/2509 356/497 |
| 7,619,746 B2 * | 11/2009 | De Lega | ............ | G01B 9/02027 356/511 |
| 7,636,168 B2 * | 12/2009 | De Lega | ............ | G01B 9/02044 356/512 |
| 7,684,049 B2 * | 3/2010 | De Groot | ............ | G01B 9/0209 356/511 |
| 7,733,497 B2 * | 6/2010 | Yun | .................... | G01B 9/02083 356/497 |
| 7,742,173 B2 * | 6/2010 | Yun | .................... | G01N 21/4795 356/479 |
| 7,843,572 B2 * | 11/2010 | Tearney | .................... | G01B 9/04 356/479 |
| 7,884,947 B2 * | 2/2011 | De Lega | ............ | G01B 9/02057 356/511 |
| 7,889,348 B2 * | 2/2011 | Tearney | ............. | G01N 21/6456 356/451 |
| 7,889,355 B2 * | 2/2011 | De Lega | ............ | G01B 9/02087 356/511 |
| 7,911,621 B2 * | 3/2011 | Motaghiannezam | ....................... | G01B 9/02078 356/477 |
| 7,933,021 B2 * | 4/2011 | De Boer | ................ | A61B 3/102 356/479 |
| 7,978,338 B2 * | 7/2011 | De Groot | ........... | G01B 11/2441 356/497 |
| 7,982,879 B2 * | 7/2011 | Desjardins | ......... | G01B 9/02043 356/477 |
| 7,995,210 B2 * | 8/2011 | Tearney | ............. | G01B 9/02004 356/479 |
| 8,115,919 B2 * | 2/2012 | Yun | ........................ | G01J 3/4412 356/301 |
| 8,126,677 B2 * | 2/2012 | De Groot | ........... | G01B 11/2441 702/166 |
| 8,452,383 B2 * | 5/2013 | Norris | .................. | A61B 5/6852 600/478 |
| 8,712,506 B2 * | 4/2014 | Courtney | ............. | A61B 8/5292 600/478 |
| 8,804,126 B2 * | 8/2014 | Tearney | ............. | G01B 9/02091 356/479 |
| 9,157,604 B2 * | 10/2015 | Woelfing | ................ | F21V 29/70 |
| 9,176,319 B2 * | 11/2015 | Bouma | .................. | G01J 3/021 |
| 9,295,391 B1 * | 3/2016 | Tearney | ................. | A61B 5/0059 |
| 9,441,948 B2 * | 9/2016 | Vakoc | ................ | G01B 9/02004 |
| 9,784,681 B2 * | 10/2017 | de Boer | .............. | G01J 3/0218 |
| 10,228,556 B2 * | 3/2019 | Reddy | ................ | G02B 6/0288 |
| 10,241,028 B2 * | 3/2019 | Rowe | ................ | G01N 21/45 |
| 2002/0080462 A1 * | 6/2002 | Patel | ........................ | G02F 1/21 359/256 |
| 2002/0127565 A1 * | 9/2002 | Cunningham | ..... | G01N 21/7743 435/6.19 |
| 2003/0027327 A1 * | 2/2003 | Cunningham | ... | G01N 33/54373 435/287.2 |
| 2003/0027328 A1 * | 2/2003 | Cunningham | ..... | G01N 21/4788 435/287.2 |
| 2003/0059855 A1 * | 3/2003 | Cunningham | ............ | G01J 3/42 435/7.9 |
| 2003/0092075 A1 * | 5/2003 | Pepper | ............ | G01N 33/54373 435/7.9 |
| 2003/0133640 A1 * | 7/2003 | Tiefenthaler | ........ | G01N 21/6486 385/12 |
| 2004/0132172 A1 * | 7/2004 | Cunningham | ..... | G01N 21/4788 435/287.2 |
| 2004/0151626 A1 * | 8/2004 | Cunningham | ....... | G01N 21/253 435/287.2 |
| 2004/0186382 A1 * | 9/2004 | Modell | ................ | A61B 5/0075 600/473 |
| 2005/0046850 A1 * | 3/2005 | Chow | ................ | G01B 11/0625 356/430 |
| 2005/0167595 A1 * | 8/2005 | Prelewitz | ............... | G02B 27/48 250/341.1 |
| 2005/0254058 A1 * | 11/2005 | Alphonse | .......... | A61B 5/14558 356/479 |
| 2006/0043302 A1 * | 3/2006 | Prelewitz | ............. | G02B 27/48 250/341.1 |
| 2007/0081236 A1 * | 4/2007 | Tearney | .............. | A61B 5/0073 359/390 |
| 2008/0013960 A1 * | 1/2008 | Tearney | .............. | G02B 21/0048 398/139 |
| 2008/0297808 A1 * | 12/2008 | Riza | ................... | G01B 9/02072 356/503 |
| 2012/0120485 A1 * | 5/2012 | Ootomo | ............ | G02B 21/0016 359/370 |
| 2012/0163825 A1 * | 6/2012 | Wu | ..................... | G02B 6/29313 398/85 |
| 2013/0107274 A1 * | 5/2013 | Vertikov | ............ | G01B 9/02045 356/479 |
| 2013/0335746 A1 * | 12/2013 | Huber | ................ | G01B 9/02061 356/498 |
| 2014/0085623 A1 * | 3/2014 | Lorbeer | ................ | G01B 9/02091 356/51 |
| 2014/0346155 A1 * | 11/2014 | Jurca | .................... | B23K 26/032 219/121.74 |
| 2014/0347655 A1 * | 11/2014 | Jurca | .................... | G01M 11/0207 356/125 |
| 2015/0098082 A1 * | 4/2015 | Wang | .................. | G01B 9/02057 356/300 |
| 2016/0059350 A1 * | 3/2016 | Schoenleber | ....... | B23K 26/0884 219/121.81 |

FOREIGN PATENT DOCUMENTS

DE    10 2010 016 862 A1    11/2011
DE    10 2011 016519 A1    10/2012

(56) References Cited

FOREIGN PATENT DOCUMENTS

| | | |
|---|---|---|
| DE | 20 2014 101 212 U1 | 8/2014 |
| DE | 10 2013 008 269 A1 | 11/2014 |
| DE | 10 2013 015 656 A1 | 3/2015 |
| DE | 10 2014 203 645 A1 | 9/2015 |
| DE | 10 2014 011 569 A1 | 2/2016 |
| DE | 10 2014 113 283 A1 | 3/2016 |
| EP | 1977850 A1 | 10/2008 |
| WO | WO 2016/062636 A1 | 4/2016 |

OTHER PUBLICATIONS

PCT International Search Report and Written Opinion, PCT Application No. PCT/EP2018/068231, dated Nov. 13, 2018, 14 pages (with English translation of ISR).

\* cited by examiner

METHOD AND DEVICE FOR MEASURING AND CONTROLLING A DISTANCE BETWEEN A MACHINING HEAD AND A WORKPIECE

CROSS-REFERENCE TO RELATED APPLICATION

This application claims priority under 35 U.S.C. 119(a) to German patent application no. 10 2017 115 922.3 filed on Jul. 14, 2017, which is incorporated by reference herein in its entirety.

BACKGROUND

The invention pertains to a method and a device for measuring and controlling a distance or focal position of a machining head or a laser beam in laser machining processes, particularly in cutting, welding, drilling or machining processes carried out by means of laser beams.

The standard technical solution for the distance measurement and/or control, e.g. in laser cutting processes, is the utilization of a capacitive measurement, i.e. the measurement of the capacitance between an insulated copper nozzle and a metallic workpiece surface. Any contamination of the copper tip, e.g. due to spatters, changes the surface of the copper nozzle and therefore the capacitance of the capacitor formed by the copper nozzle and the workpiece. Since this change takes place independently of the distance, it interferes with the control circuit for the distance control and therefore leads to an inaccurate control of the distance between the machining head and the workpiece.

Nonmetallic surfaces practically cannot be reliably measured with capacitive methods such that no precise distance control can be achieved with this technique.

In laser welding processes, camera-based triangulation sensors are normally used for the distance control. However, camera-based triangulation sensors also reach the limits of their usability at a high spatter volume during the welding process. Any particles located in the image field (whether still glowing and therefore luminous or already cooled, e.g. spatters, weld smoke or metal vapor) interfere with the image processing and therefore the accuracy and usability of such a camera-based measuring method.

DE 38 26 634 A1 concerns a tactile sensor that is arranged concentric to a nozzle body and preferably forms a capacitance with this nozzle body. An axial displacement of the tactile sensor is realized by means of a special disk-like spring arrangement. A distance control can therefore also be achieved with nonmetallic materials.

U.S. Pat. No. 3,970,911 A discloses a device for controlling the distance between a cutting torch and a workpiece in an automatic flame cutting machine. In this case, the distance between the welding torch and the workpiece varies the oscillating frequency of an electrical control circuit. A discriminator converts this frequency into direct current signals, which are used for correcting the deviations and for holding the torch at an essentially constant distance from the workpiece. If the torch moves away from the workpiece, the bandwidth of the discriminator is widened, e.g. due to damping or discharging a discriminator tuning circuit. A field effect transistor is suitable for use as a damping resistor and a capacitor-diode unit can be used for switching off the tuning circuit. In this case, the control voltage is tapped at the output of an amplifier that is connected to the discriminator and fed to a variable resistor or capacitor. A control voltage for changing the frequency range is obtained from the analog signal component of the controller output.

According to DE 20 2014 101 212 U1, a capacitive measuring system for measuring the height of a laser head above a plastic workpiece comprises a laser head nozzle that forms a first plate of a capacitor, the dielectric section of which is formed by the plastic workpiece, a high-frequency oscillator that responds to capacitance changes, is functionally coupled to the capacitor and delivers an output signal, as well as a high-order bypass filter for processing the output signal of the oscillator in order to measure changes in the capacitance of the capacitor.

DE 100 56 329 B4 describes an optical distance measuring method and a distance sensor for controlling the distance of a machining head of a workpiece machining system from the surface of a workpiece to be machined. In this case, a measuring object is projected on a surface and the image of the measuring object on the surface is projected on a receiver arrangement, in which the incident image is subjected to spatial filtering corresponding to the measuring object. The spatially filtered light flux is measured for at least two wavelength ranges in order to deliver light flux measurement signals, which are compared with nominal values that are assigned to the wavelength ranges and correspond to a predefined nominal position of the surface, in order to generate an output signal corresponding to the distance from the nominal position.

DE 10 2014 203 645 A1 concerns a method for optically determining a distance between an opening formed on a device and a reference surface with the following steps: illuminating the reference surface through the opening by means of at least one illuminating beam, which passes through the opening at an angle, capturing at least one image of the reference surface through the opening and determining the distance based on an offset between a region of the reference surface illuminated by the illuminating beam and an edge contour of the opening in the at least one captured image.

WO 2016/062636 A1 discloses a device for measuring the depth of a weld seam in real time while a workpiece is welded or joined by means of laser radiation. To this end, the light of a measurement light source is coupled into a reference arm and into a measurement arm by a beam splitter. A measurement light beam of the measurement arm is coupled into the beam path of a processing beam and focused on a workpiece together with the processing beam by a focusing lens. The measurement light reflected by the workpiece is transmitted along the working beam path to an evaluation unit, in which the measurement light reflected by the workpiece is superimposed with the reflected light from the reference arm, in order to determine the depth of a weld seam based on the path differences between the measurement arm and the reference arm.

One common property of all known methods for measuring and/or controlling a distance or focal position is that a measurement is carried out by means of a more or less large sensor surface and workpiece surface. If the workpiece surface is curved or inclined or if the sensor surface is soiled or only partially soiled, the sensor system no longer delivers reliable results. In capacitive distance measurements, the sensor system encounters significant problems if the sensor does not completely lie opposite of the workpiece surface, e.g. on component edges. In this case, the capacitive distance measurement and control method only functions conditionally.

SUMMARY

The invention is therefore based on the objective of developing a method for the distance measurement of a machining head, particularly a laser machining head, which allows a highly dynamic and precise adjustment of the distance between the machining head and a workpiece regardless of the workpiece material and the process conditions. The invention furthermore aims to make available a device for carrying out this method.

These objectives are respectively attained with the method according to claim 1 and the device according to claim 8. Advantageous embodiments and enhancements of the invention are described in the respective dependent claims.

According to the invention, a distance between a machining head, particularly a laser machining head, and a workpiece is measured and adjusted by splitting the light of a measurement light source into a measurement light beam and a reference light beam that is coupled into a reference arm. The measurement light beam is coupled into a processing beam path and focused on a workpiece surface by a focusing lens of the processing beam path and the measurement light beam reflected on the workpiece surface is superimposed with the reflected reference light beam from the reference arm. A measurement and evaluation unit then evaluates the information contained in the superimposed measurement and reference light beams based on the path difference between the measurement arm and the reference arm in order to obtain information on the distance between the machining head and the workpiece and to generate a corresponding distance or adjustment signal.

In this case, the measuring principle used for the distance measurement is optical short-coherence interferometry. According to this principle, the optical measurement beam is guided through the machining head, e.g. a laser cutting head, such that the distance between the machining head and the workpiece is measured directly in the region of the interaction zone with the processing beam such as a working laser beam, i.e. in the region of the so-called TCP (Tool Center Point). Based on a thusly determined measurement signal, the distance between the machining head and the workpiece can be controlled in a highly dynamic fashion by activating one axis of the processing machine accordingly. The distance measurement can also be used for adjusting the focal position, wherein a corresponding optical system of the processing beam path is displaced with the aid of an actuator system installed in the machining head, i.e. actuating elements that move the optical system in the direction of its optical axis, such that the working focal point assumes the position relative to the workpiece surface required for the machining process. The measuring method is also not affected by thermal lens effects.

The range of application of the inventive method includes machining processes, in which a capacitive distance control does not function due to process emissions, as well as processes for machining materials that cannot or not reliably measured with a capacitive sensor system, e.g. plastics, fiber-reinforced plastics and the like.

According to an advantageous embodiment of the invention, it is proposed that the measurement light beam is coupled into the processing beam path with an incline or a parallel offset relative to the optical axis of the processing beam path such that the measurement light beam is focused on the workpiece surface adjacent to the processing beam.

It is furthermore possible to split the measurement light beam into at least two partial beams, preferably into at least three partial beams, which are coupled into the processing beam path with an incline or parallel offset relative to the optical axis of the processing beam path such that the partial beams are focused on the workpiece surface offset to one another, as well as offset to the processing beam.

Another enhancement of the invention is characterized in that the measurement light beam is focused in an interaction zone between the processing beam and the workpiece coaxial to the processing beam such that a measurement light spot on the workpiece surface has a diameter, which is greater than the focal point of the processing beam on the workpiece surface.

The offset of the measurement light spot or measurement light spots relative to the TCP on the workpiece surface or the enlargement of the measurement light spot as a result of defocusing the measurement light beam respectively makes it possible to ensure that at least a portion of the measurement light is always incident on the workpiece surface regardless of the advancing or cutting direction of the machining head and that the distance of the machining head from the workpiece can therefore always be precisely measured.

The inventive method also makes it possible to use materials other than copper for the nozzle tip of the machining head. In addition, the ceramic insert required for insulating the conductive nozzle tip in capacitive distance measuring methods can be eliminated.

According to an advantageous embodiment of the invention, it is proposed that the measurement light beam is focused in an interaction zone between the processing beam and the workpiece coaxial to a processing beam, wherein a focal point of the measurement light on the workpiece surface has a diameter of about 10 µm to 70 µm, preferably about 40 µm to 60 µm, particularly about 50 µm. In comparison with competing measuring methods, this allows a punctiform measurement that is not affected by the surface condition, the material and the surface shape of the workpiece and, in particular, the emissions from the machining process such as spatters, thermal and optical emissions.

This allows a constant and robust measurement and therefore also an interference-free control of the distance between the machining head, particularly a laser machining head, and the workpiece, wherein a distance signal corresponding to the actual distance between the machining head and the workpiece is compared with a nominal distance signal in order to obtain a control signal that is fed to a control circuit, which in turn initiates such a displacement of the machining head in the direction of a processing beam that the difference between the nominal distance and the actual distance is reduced.

The inventive method can be advantageously carried out with a corresponding device for measuring and adjusting a distance between a machining head, particularly a laser machining head, and a workpiece, wherein said device comprises a measurement light source, a beam splitter that splits the light of the measurement light source into a measurement light beam and a reference light beam, a reference arm, through which the reference light beam is guided, an optical system for coupling the measurement light beam into a processing beam path featuring a focusing lens for focusing light on a workpiece surface, and an optical device for superimposing the measurement light beam reflected on a workpiece surface with the reflected reference light beam from the reference arm. Furthermore, a measurement and evaluation unit is provided and designed for evaluating information contained in the superimposed measurement and reference light beams based on the path difference between the measurement arm and the reference arm in order to obtain information on the distance between the machining head and the workpiece and to generate a corresponding distance or adjustment signal.

In order to control the distance, particularly during a machining process, the measurement and evaluation unit is furthermore designed for comparing a determined distance signal corresponding to the actual distance with a nominal distance signal in order to obtain a control signal, as well as for feeding the control signal to a control circuit that is designed for initiating such a displacement of the machining head in the direction of a processing beam that the difference between the nominal distance and the actual distance is reduced.

The beam splitter advantageously features an optical fiber coupler that forms the optical device for superimposing the measurement light beam with the reference light beam.

An optical deflection unit is advantageously arranged upstream of the optical system for coupling the measurement light beam into the processing beam path such that the measurement light beam can be coupled into the processing beam path with an incline relative to the optical axis of the processing beam path in order to thereby focus the measurement light beam on the workpiece surface adjacent to the processing beam. The deflection unit, which is preferably realized in the form of a scanner, makes it possible to always position the measurement light spot on the workpiece surface in front of or adjacent to the working laser beam such that the measurement light is always incident on the workpiece surface. In this case, the optical deflection unit may be designed for splitting the measurement light beam into at least two partial measurement light beams.

BRIEF DESCRIPTION OF DRAWINGS

Examples of the invention are described in greater detail below with reference to the drawings. In these drawings:

FIG. 4a shows a schematic representation of a laser machining head according to FIG. 2 with another optical system for coupling in a measurement light beam; and FIG. 4b shows an enlarged schematic representation of the output region of the processing beam and the partial measurement light beams in FIG. 4a.

DETAILED DESCRIPTION OF EMBODIMENTS

Corresponding components and elements are identified by the same reference symbols in the different figures.

Figure 1:
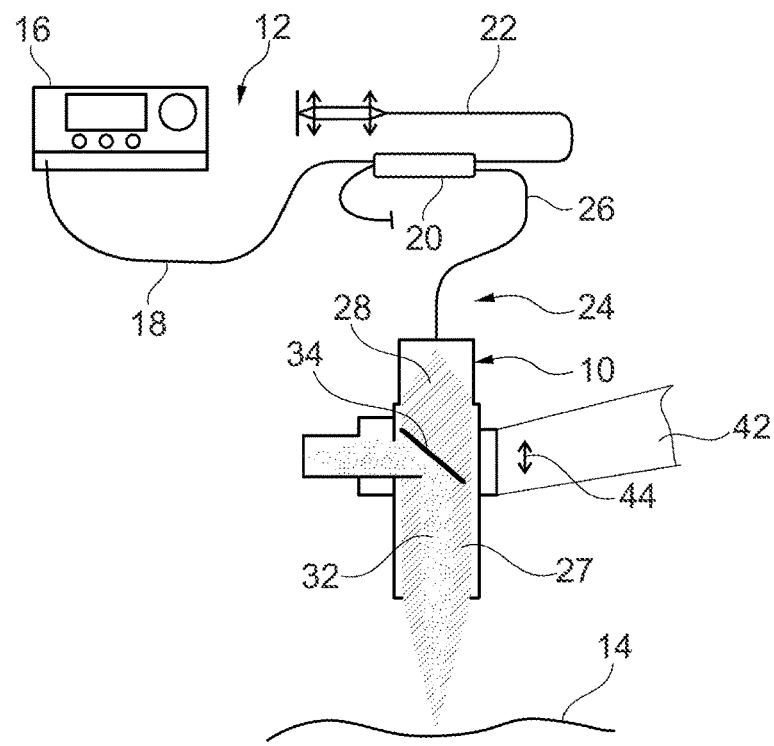
FIG. 1 shows a schematic representation of a processing device for carrying out the inventive distance measurement and control method.

FIG. 1 shows a laser machining head 10 with connected optical sensor system 12 for determining the distance between the laser machining head 10 and a workpiece 14. The determination or measurement of the distance is based on the principle of optical coherence tomography (short-coherence interferometry), which utilizes the coherence properties of light with the aid of an interferometer. To this end, the measurement and evaluation unit 16 contains a broadband light source (superluminescent diode, SLD; SweptSource light source (spectrally variable light source) or the like), which couples the measurement light into an optical waveguide 18. The measurement light is split into an reference arm 22 and a measurement arm 24 in a beam splitter, which preferably features an optical fiber coupler 20, wherein said measurement arm comprises an optical waveguide 26 and a beam path 27 of the measurement light in the laser machining head 10.

Figure 2:
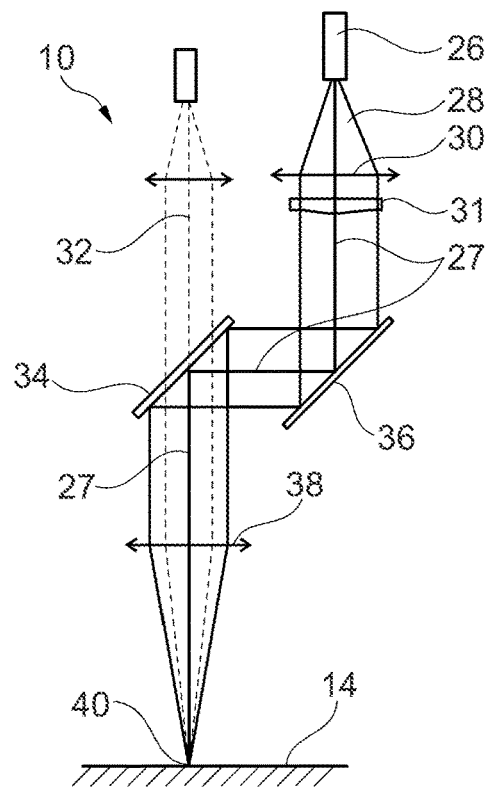
FIG. 2 shows a schematic representation of a laser machining head with an optical system for coupling in a measurement light beam.

According to the schematic representation in FIG. 2, the measurement light (measurement light beam 28) being output by the optical waveguide 26 is collimated by collimating optics, 30 such that it can be coaxially or almost coaxially superimposed with a processing beam 32 in the laser machining head 10. In this case, the superposition is realized by means of an optical system for coupling in the measurement light, which in FIG. 1 is merely indicated schematically in the form of a partially transparent deflection mirror, particularly a dichroitic deflection mirror 34 that receives the measurement light from the collimating optics 30 either directly (FIG. 1) or via another deflection mirror 36 (FIG. 2). Subsequently, the processing beam 32 and the measurement light beam 28 are focused on the workpiece surface by means of a common lens 38, which is referred to as focusing lens below. In this case, the measurement light beam 28 is incident on the workpiece surface in the region of the interaction zone between the processing beam 32 and the workpiece 14. With the exception of largely optimal transmission properties for the measurement light, the focusing lens 38 and the other optical components in the processing beam path are not subject to any special requirements.

The focal position and the focal diameter of the measurement light beam 28 are adjusted in such a way that the measurement light is directed at the workpiece surface in the region of the machining point 40 (TCP; Tool Center Point). In order to vary the focal position, i.e. the point of incidence of the measurement light on the workpiece surface, such that a directionally independent measurement can always be achieved, an optical deflection unit such as a scanner 31, which allows the local modulation of the measurement point, particularly its position on the workpiece surface, may be arranged in the measurement light beam path 27, e.g. downstream of the collimating optics 30. In FIG. 2, the scanner 31 is indicated in the form of a camera wedge or prism that, although not illustrated in greater detail, can be respectively turned about the optical axis of the measurement light beam path 27 or the collimating optics 30 or pivoted about an axis extending perpendicular thereto, wherein said scanner makes it possible to incline the optical axis of the measurement light beam path 27 relative to the optical axis of the processing beam 32 such that the measurement light beam 28 is incident on the workpiece surface adjacent to the processing beam 32, i.e. adjacent to the TCP 40.

A corresponding adjustment of the optical waveguide 26 and the collimating optics 30 furthermore makes it possible to couple the measurement light beam 28 into the processing beam path with a parallel offset relative to the optical axis of the processing beam 32 in order to achieve the same effect, i.e. that the measurement light beam 28 is incident on the workpiece surface adjacent to the processing beam 32, i.e. adjacent to the TCP 40. The optical deflection unit can be eliminated in this case.

In order to avoid moving optical elements for adapting the focal position or measurement light spot position to the advancing or welding direction in the measurement light beam path, the measurement light beam 28 is in another embodiment of the invention split into at least two partial beams, preferably at least three partial beams that are respectively coupled into the processing beam path with an incline or parallel offset relative to the optical axis of the processing beam path. In this case, the partial beams are arranged in such a way that they are focused on the workpiece surface offset to one another, as well as offset to the processing beam. They may be circumferentially distributed around the processing beam 32 arbitrarily or uniformly. The offset of the partial beams relative to one another and relative to the processing beam 32, as well as the circumferential distribution, can be freely selected in accordance with the requirements of the machining process. In this way, it can be ensured that at least one of the partial measurement beams, preferably two of the partial measurement beams, is/are always incident on the workpiece surface adjacent to the TCP 40 in any cutting direction and therefore allow/s the distance measurement, namely even if the partial measurement light beams are fixed and immovable.

Figures 4A, 4B:
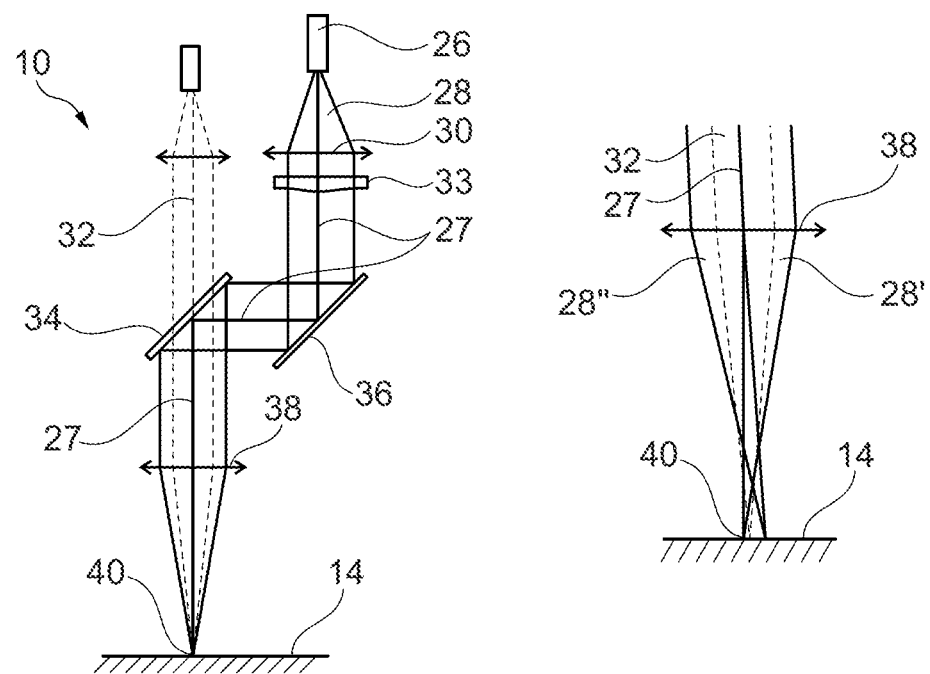

In the exemplary embodiment illustrated in FIG. 4a, a roof-shaped double camera wedge 33 is arranged downstream of the collimator 30 of the measurement light beam path as the deflection unit for forming multiple partial measurement beams, wherein said double camera wedge splits the measurement light beam 28 into two partial measurement light beams 28' and 28", which are coupled into the processing beam path with an incline and—as illustrated in FIG. 4b—focused in respective measurement light spots 29' and 29" lying adjacent to the TCP 40 by the focusing lens 38.

Three, four or more V-shaped double camera wedges, as well as pyramid-shaped or funnel-shaped double camera wedges, may be used for forming two or more partial measurement beams.

The measurement light spot or focal point of the measurement light on the workpiece surface has a diameter of about 10 µm to 70 µm, preferably about 40 µm to 60 µm, particularly about 50 µm. In a cutting head with an exemplary focal length of 100 mm, a focal point of the measurement light with a diameter of about 18 µm is produced. Even if motor-driven optical systems such as a zoom module are located in the processing beam path, only the diameter of the measurement point, i.e. the focal point of the measurement light, changes during a displacement of the optical systems, but not the optical path of the measurement arm, such that a definite distance measurement can still take place. The measuring method is also not affected by thermal lens effects.

In another embodiment of the invention, the diameter of the measurement light spot on the workpiece surface can be varied in that the measurement light beam 28 is incident in the TCP 40 on the workpiece surface 14 in a slightly defocused fashion. The measurement light beam 28 is defocused, e.g., by changing the arrangement of the optical components of the collimating optics 30. For example, a displacement of the collimating optics 30 or a lens of the collimating optics 30 along the optical axis of the measurement light beam path causes the measurement light beam 28 to no longer be completely collimated and slightly defocused after passing through the common focusing lens 38 such that the diameter of its light spot on the workpiece surface is larger than the focal point of the processing beam 38 in the TCP 40. Due to the larger diameter of the measurement light spot, a portion of the measurement light beam is always incident on the surface of the workpiece 14 such that a directionally independent measurement can be achieved. If the measurement light beam 28 is coaxially coupled into the processing beam path, in particular, a portion of the measurement light is always incident on the workpiece 14 in front of and adjacent to the TCP 40. In this embodiment, the deflection unit downstream of the collimating optics 30 can be eliminated.

The measurement light reflected by the workpiece surface is projected on the output/input face of the optical waveguide 26 by the focusing lens 38 and the collimating optics 30, superimposed with the reflected light from the reference arm 22 in the optical fiber coupler 20 and subsequently guided back into the measurement and evaluation unit 16. The superimposed light contains information on the path length difference between the reference arm 22 and the measurement arm 24. This information is evaluated in the measurement and evaluation unit 16 in order to thereby obtain information on the distance between the workpiece 14 and the laser machining head 10.

The measurement of the distance between the machining head 10 and the workpiece surface is calibrated prior to the start of the machining process. Subsequently, the distance of the machining head from the workpiece surface can be measured in order to either update the position of the laser focal point or adjust the distance to a nominal distance prior to the start of the machining process. The machining process may be carried out with or without online control depending on the type of machining process.

Based on the distance information, the measurement and evaluation unit 16 generates an adjustment or control signal that is proportional to a manipulated variable and adjusts and, in particular, constantly controls the distance between the workpiece 14 and the laser machining head 10 by means of an adjusting axis of a processing machine, e.g. a robot. In this case, the laser machining head 10 held, e.g., in one hand 42 of a robot is moved in the direction of the processing laser beam (z-direction) as indicated with the double arrow 44. However, it is also possible to generate an adjustment or control signal for updating the working laser focal point based on the distance information.

Figure 3:
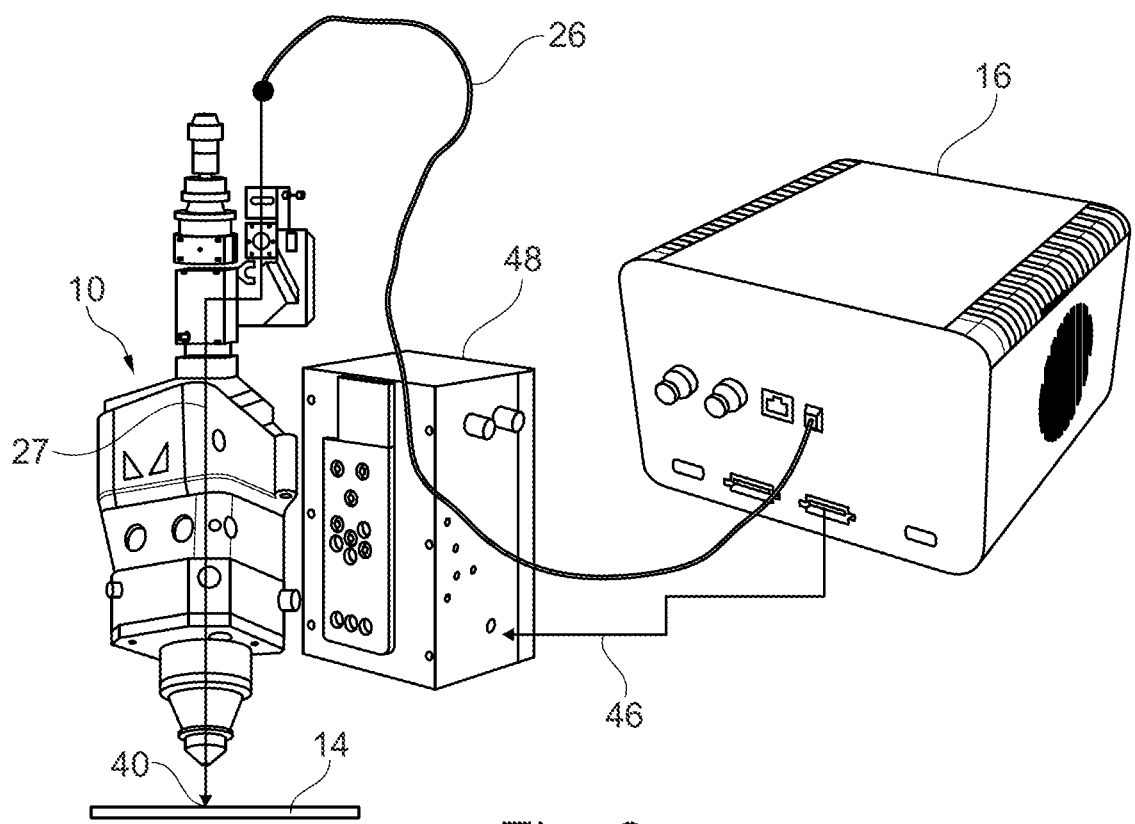
FIG. 3 shows a perspective representation of a laser machining head with connected measurement and evaluation unit and control circuit.

According to FIG. 3, the adjustment or control signal is fed from the measurement and evaluation unit 16 to a control circuit 48 via a connecting line 46, wherein said control circuit activates the adjusting axis of the processing machine for the distance adjustment, but this activation is not illustrated in greater detail. This principle also functions with other adjusting axes, e.g., with axes installed in the laser machining head 10 and with the adjusting axes of a processing machine.

Due to the nearly arbitrary configuration of short-coherence interferometry, i.e. due to the selection of the wavelength of the light source and the width of the emission spectrum, a measurement range between about 15 mm and 5 mm can be adjusted in the direction of the processing laser beam (z-direction), wherein a broad emission spectrum results in a shorter measuring range than a narrow emission spectrum. In this way, different resolutions can also be realized in the vertical direction (z-direction). In this case, the wavelength of the light source affects the ability to focus the measurement light, wherein shorter wavelengths result in superior focusing ability.

The invention claimed is:

1. A method for measuring and adjusting a distance between a laser machining head and a workpiece, the method comprising:
   splitting light of a measurement light source into a measurement light beam and a reference light beam,
   coupling the reference light beam into a reference arm,
   coupling the measurement light beam into a processing beam path,
   focusing the measurement light beam on a workpiece surface by a focusing lens of the processing beam path, superimposing the measurement light beam reflected from the workpiece surface with the reflected reference light beam from the reference arm, and evaluating the superimposed measurement light and reference light beams based on the path difference between the measurement arm and the reference arm in order to obtain information on the distance between the machining head and the workpiece and to generate a corresponding distance or adjustment signal, wherein the measurement light beam is focused in an interaction zone between the processing beam and the workpiece and is coaxial to the processing beam such that a measurement light spot on the workpiece surface is circular and has a diameter greater than a focal point of the processing beam on the workpiece surface.

2. The method according to claim 1, characterized in that the measurement light beam is focused in an interaction zone between a processing beam and the workpiece coaxial to the processing beam.

3. The method according to claim 1, characterized in that a focal point of the measurement light on the workpiece surface has a diameter of 10 μm to 70 μm.

4. A method for controlling a distance between a laser machining head, and a workpiece, the method comprising:

determining a distance signal corresponding to the distance between the laser machining head and the workpiece by:

splitting light of a measurement light source into a measurement light beam and a reference light beam, coupling the reference light beam into a reference arm, coupling the measurement light beam into a processing beam path, focusing the measurement light beam on a workpiece surface by a focusing lens of the processing beam path, superimposing the measurement light beam reflected from the workpiece surface with the reflected reference light beam from the reference arm, and evaluating the superimposed measurement light and reference light beams based on the path difference between the measurement arm and the reference arm in order to obtain information on the distance between the laser machining head and the workpiece and to generate a corresponding distance signal, wherein the measurement light beam is focused in an interaction zone between the processing beam and the workpiece and is coaxial to the processing beam such that a measurement light spot on the workpiece surface is circular and has a diameter greater than a focal point of the processing beam on the workpiece surface, comparing the determined distance signal corresponding to the actual distance with a nominal distance signal in order to obtain a control signal, and providing the control signal to a control circuit to initiate displacement of the laser machining head in a direction of the processing beam such that a difference between the nominal distance and the actual distance is reduced.

* * * * *